United States Patent
Wu

(10) Patent No.: US 11,194,325 B2
(45) Date of Patent: Dec. 7, 2021

(54) UNMANNED AERIAL VEHICLE AND FAIL-SAFE METHOD THEREOF

(71) Applicant: Coretronic Corporation, Hsin-Chu (TW)

(72) Inventor: Bing-Syun Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 207 days.

(21) Appl. No.: 16/748,751

(22) Filed: Jan. 21, 2020

(65) Prior Publication Data

US 2020/0249672 A1 Aug. 6, 2020

(30) Foreign Application Priority Data

Feb. 1, 2019 (CN) .......................... 201910102906.7

(51) Int. Cl.
*G05D 1/00* (2006.01)
*B64C 39/02* (2006.01)
(Continued)

(52) U.S. Cl.
CPC ......... *G05D 1/0055* (2013.01); *B64C 39/024* (2013.01); *G05B 19/048* (2013.01); *G05D 1/0808* (2013.01); *G08G 5/0039* (2013.01); *G08G 5/0069* (2013.01); *B64C 2201/141* (2013.01)

(58) Field of Classification Search
CPC .. G05D 1/0055; G05D 1/0808; B64C 39/024; B64C 2201/141; G05B 19/048; G08G 5/0039; G08G 5/0069
See application file for complete search history.

(56) References Cited

U.S. PATENT DOCUMENTS 9,809,306 B2 11/2017 Stark et al.
10,157,545 B1 * 12/2018 Baker .................... G08G 5/006
(Continued)

FOREIGN PATENT DOCUMENTS

CN 203876988 10/2014
CN 105302043 2/2016
(Continued)

*Primary Examiner* — Thomas G Black
*Assistant Examiner* — Anthony M Gartrelle
(74) *Attorney, Agent, or Firm* — JCIPRNET

(57) ABSTRACT

An unmanned aerial vehicle and a fail-safe method thereof are provided. The unmanned aerial vehicle includes at least one actuator, a failure processing circuit, and a flight controller. The actuator is configured to drive the flight behavior of the unmanned aerial vehicle. The failure processing circuit is configured to: define a corresponding relationship between the multiple failure states and the multiple protection measures, wherein each protection measure is respectively defined with a priority level and each protection measure is used to correspondingly change the flight behavior of the unmanned aerial vehicle; determine multiple current failure states when the flight behavior takes place; and select, according to the corresponding relationship, the selected protection measure having the highest priority level among the protection measures corresponding to the current failure state. The flight controller is used to change the flight behavior of the unmanned aerial vehicle according to the selected protection measures.

20 Claims, 2 Drawing Sheets

(51) Int. Cl.
*G05B 19/048* (2006.01)
*G08G 5/00* (2006.01)
*G05D 1/08* (2006.01)

(56) References Cited

U.S. PATENT DOCUMENTS

| | | | |
|---|---|---|---|
| 2015/0280919 A1 | 10/2015 | Cullen et al. | |
| 2016/0307447 A1* | 10/2016 | Johnson | G08G 5/0034 |
| 2016/0347462 A1* | 12/2016 | Clark | B64D 17/162 |
| 2019/0033862 A1* | 1/2019 | Groden | G05D 1/0072 |

FOREIGN PATENT DOCUMENTS

| | | |
|---|---|---|
| CN | 106716281 | 5/2017 |
| CN | 206497536 | 9/2017 |
| TW | 201639748 | 11/2016 |
| TW | I558617 | 11/2016 |
| TW | I590987 | 7/2017 |
| WO | 2013135044 | 9/2013 |
| WO | 2018007614 | 1/2018 |

\* cited by examiner

UNMANNED AERIAL VEHICLE AND FAIL-SAFE METHOD THEREOF

CROSS-REFERENCE TO RELATED APPLICATION

This application claims the priority benefit of China application serial no. 201910102906.7, filed on Feb. 1, 2019. The entirety of the above-mentioned patent application is hereby incorporated by reference herein and made a part of this specification.

BACKGROUND OF THE DISCLOSURE

Field of the Disclosure

The present disclosure relates to an unmanned flight technology, and more particularly to an unmanned aerial vehicle and a fail-safe method thereof.

Description of Related Art

A drone includes subsystems such as sensors, power sources, and navigation device. Each subsystem is composed of multiple components to operate together. Any failure of one component can cause safety concerns. The concept of failure-protection or fail-safe is to avoid or reduce the damage caused by a specific failure of the subsystem.

The current failure-protection of a drone is, for example, switching to a backup control module or directly shutting down the power source when a failure is detected. However, such an approach is not practical. For example, if switched to the backup control module when the failure is detected, the function of failure-protection cannot be performed when the failed component is the power source itself. If the power source is directly shut down when the failure is detected, it is very likely to cause damage or result in a greater loss.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE DISCLOSURE

The disclosure provides an unmanned aerial vehicle and a fail-safe method thereof, which can take the most appropriate protection measures when a failure occurs.

The objectives and advantages of the disclosure may be further understood in the technical features disclosed in the disclosure.

To achieve one or a part or all the objectives or other objectives, an embodiment of the present disclosure provides an unmanned aerial vehicle that includes at least one actuator, a failure processing circuit, and a flight controller. The at least one actuator is configured to drive the flight behavior of the unmanned aerial vehicle. The failure processing circuit is configured to: define a corresponding relationship between a plurality of failure states and a plurality of protection measures, wherein each protection measure is respectively defined with a priority level and each protection measure is configured to correspondingly change the flight behavior of the unmanned aerial vehicle; determine a plurality of current failure states when the flight behavior takes place, wherein the plurality of defined failure states include the plurality of current failure states; and select, according to the corresponding relationship, the selected protection measure having the highest priority level among the protection measures corresponding to the current failure state. The flight controller is coupled to the actuator and the failure processing circuit and is configured to change the flight behavior of the unmanned aerial vehicle according to the selected protection measure.

To achieve one or a part or all the objectives or other objectives, an embodiment of the present disclosure provides a fail-safe method for an unmanned aerial vehicle, including the steps of: defining a corresponding relationship between a plurality of failure states and a plurality of protection measures, wherein each protection measure is respectively defined with a priority and each protection measure is configured to correspondingly change the flight behavior of the unmanned aerial vehicle; determining a plurality of current failure states when the flight behavior of the unmanned aerial vehicle takes place, wherein the defined failure states include the plurality of current failure states; selecting, according to the corresponding relationship, the selected protection measure having the highest priority level among the protection measures corresponding to the current failure state; and changing the flight behavior of the unmanned aerial vehicle according to the selected protection measure.

In an embodiment of the disclosure, the fail-safe method further includes the step of: stopping changing the flight behavior according to the protection measure with lower priority other than the selected protection measure.

Based on the above, the unmanned aerial vehicle and the fail-safe method thereof in the embodiment of the present disclosure define a corresponding relationship between a plurality of failure states and a plurality of protection measures, and each protection measure is respectively defined with a priority level. When multiple failure states occur at the same time, the protection measure having the highest priority level among the plurality of protection measures corresponding to the plurality of currently occurred failure states is selected. Accordingly, no matter whether multiple failure states occur simultaneously or alternately, the most appropriate protection measures can be taken according to the defined priority levels to minimize damage and loss.

In order to make the aforementioned features and advantages of the disclosure more comprehensible, embodiments accompanying figures are described in detail below.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
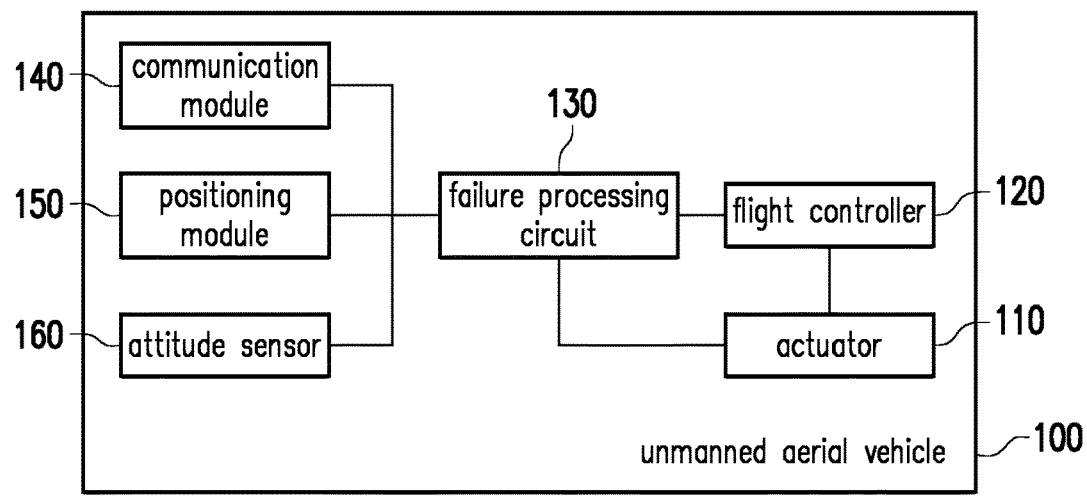
FIG. 1 is a block diagram of an unmanned aerial vehicle according to an embodiment of the present disclosure.

FIG. 1 is a block diagram of an unmanned aerial vehicle according to an embodiment of the present disclosure.

Referring to FIG. 1, an unmanned aerial vehicle 100 is an aircraft that flies without human operators being present in the aircraft and includes an actuator 110, a flight controller (FC) 120, a failure processing circuit 130, a communication module 140, a positioning module 150, and an attitude sensor 160.

The actuator 110 is configured to drive the flight behavior of the unmanned aerial vehicle 100. For example, the actuator 110 includes a power source (e.g., a motor), an electronic speed controller, and a rotor, etc., capable of driving the flight behavior of the unmanned aerial vehicle 100 according to the electronic signals from the flight controller 120, such as taking-off, turning, shifting, landing, etc. Herein, as long as the actuator 110 (e.g., power source) begins to operate, no matter whether or not the unmanned aerial vehicle 100 is off the ground, a flight behavior has taken place. Moreover, the present disclosure provides no limitation to the number of actuators 110, and depending on the design, the unmanned aerial vehicle 100 may include one or more sets of actuators 110.

The flight controller 120 is coupled to the actuator 110 for generating and transmitting an electronic signal to the actuator 110 to control the operation of the actuator 110, and to further control the flight behavior of the unmanned aerial vehicle 100. For example, the flight controller 120 determines how to control the navigation of the unmanned aerial vehicle 100 or adjusts the attitude of the unmanned aerial vehicle 100, etc., according to the messages efrom other components of the unmanned aerial vehicle 100. The messages is, for example, remote control signals from a communication module 140, location information from a positioning module 150, or acceleration data from the attitude sensor 160, but the disclosure is not limited thereto.

The failure processing circuit 130 is coupled to the flight controller 120 and other components of the unmanned aerial vehicle 100, including the actuator 110, the communication module 140, the positioning module 150, the attitude sensor 160, and the like. The failure processing circuit 130 is configured to detect a failure state of the unmanned aerial vehicle 100, and determine a protection measure according to the detected failure state of the unmanned aerial vehicle 100, and then notify the flight controller 120 of the determined protection measure in order for the flight controller 120 to control the flight behavior of the unmanned aerial vehicle 100 accordingly. The types of failure states that the failure processing circuit 130 can detect include component malfunctions, abnormal attitude, or environmental anomalies, and the present disclosure provides no limitation thereto. For example, the failure processing circuit 130 can be a central processing unit (CPU), or other programmable general-purpose or specific-purpose microprocessor, a digital signal processor (DSP), a programmable controller, application specific integrated circuits (ASIC), programmable logic device (PLD), field programmable gate array (FPGA), or the like or a combination of these devices, etc., the disclosure is not limited thereto.

In addition, it should be noted that the failure processing circuit 130 may be a circuit or a chip independent of the flight controller 120, or may be integrated into a single circuit or a chip with the flight controller 120. The disclosure is not limited thereto.

The communication module 140 is configured to receive a remote control signal from an external device. For example, the communication module 140, for example, includes a wireless transmission module such as a WiFi module or a radio transceiver module, and can be used to receive the remote control signal from the external device such as a smartphone, a tablet PC, a remote controller (RC), or a ground control station (GCS), but the disclosure is not limited thereto.

The positioning module 150 is configured to obtain location information of the unmanned aerial vehicle 100. For example, the positioning module 150 may be a global positioning system (GPS) receiver based on satellite positioning system, and can receive the current latitude and longitude of the unmanned aerial vehicle 100, but the disclosure is not limited thereto.

The attitude sensor 160 is configured to sense the current attitude of the unmanned aerial vehicle 100. For example, the attitude sensor 160 includes one or a combination of a tri-axial acceleration sensor and a gyroscope, and the data obtained by these above components can reflect the current attitude of the unmanned aerial vehicle 100, including, for example, a yaw angle, a roll angle and a pitch angle.

Figure 2:
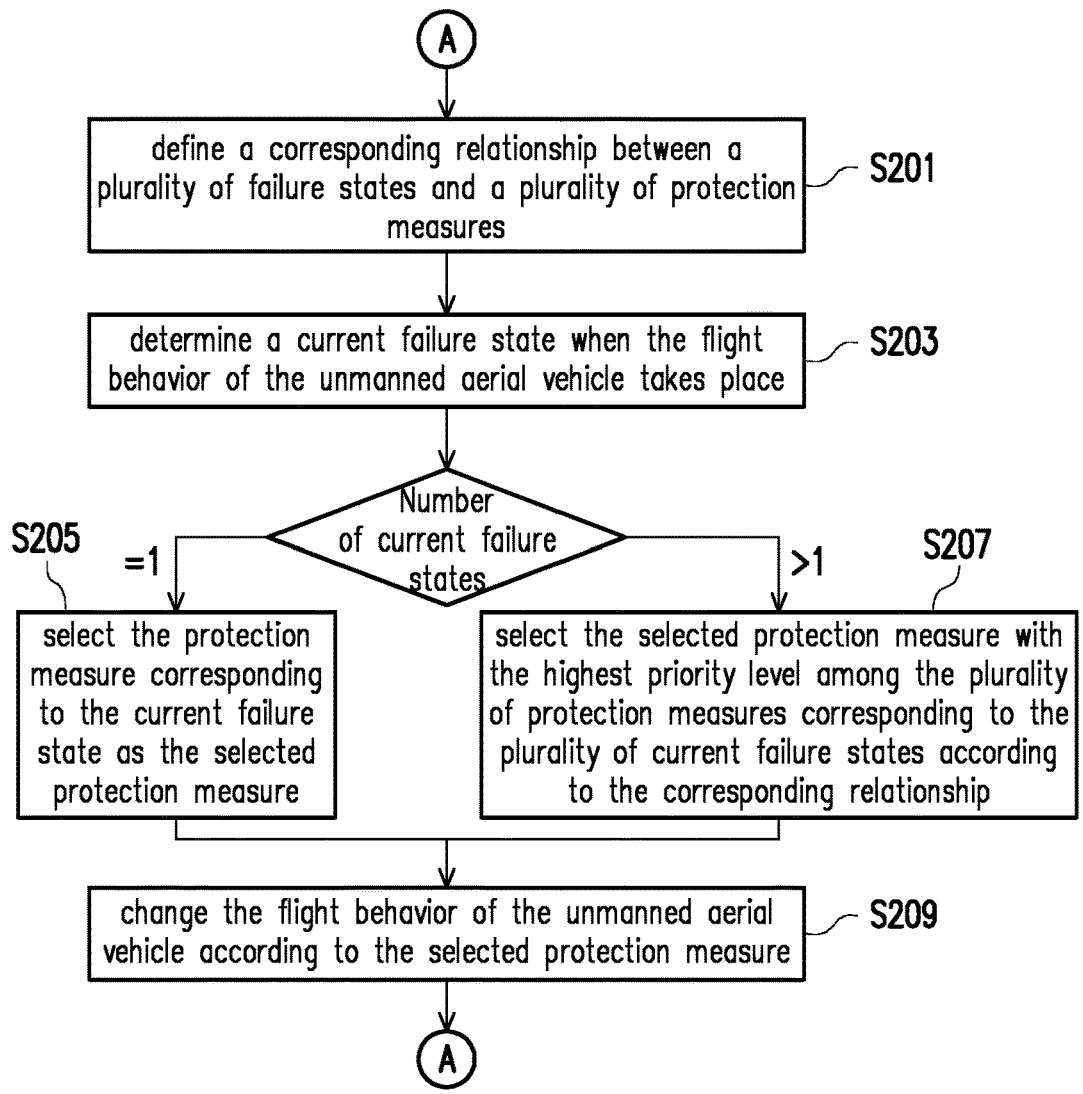
FIG. 2 is a flow chart of a fail-safe method according to an embodiment of the present disclosure.

FIG. 2 is a flow chart of a fail-safe method according to an embodiment of the present disclosure.

Referring to FIG. 1 and FIG. 2, first, the failure processing circuit 130 defines a corresponding relationship between a plurality of failure states and a plurality of protection measures (step S201), wherein the protection measures are used to change the flight behavior of the unmanned aerial vehicle 100, and the failure processing circuit 130 will define different priority levels for each of the protection measures.

Specifically, the remaining capability of the unmanned aerial vehicle 100 is different when different failure states occur, and thus the possible damage or severity may be different. Based on the above, for a more severe failure state, the failure processing circuit 130 defines a higher priority level for the corresponding protection measure.

For example, the corresponding relationship between a plurality of failure states and a plurality of protection measures and the priority level of each protection measure are shown in Table 1 below.

TABLE 1

| Failure state | Protection measure | Priority level for protection measure |
|---|---|---|
| Malfunction of communication module | Return flight | Low |
| Malfunction of | In-situ landing | Medium |

TABLE 1-continued

| Failure state | Protection measure | Priority level for protection measure |
|---|---|---|
| actuator | | |
| Malfunction of positioning module | | |
| Abnormality of current attitude | Turn off actuator | High |

Specifically, when the failure state of the unmanned aerial vehicle 100 detected by the failure processing circuit 130 is a malfunction of the communication module 130, although the unmanned aerial vehicle 100 cannot be remotely controlled by an external device, the unmanned aerial vehicle 100 still has normal flight and navigating capability. Therefore, the protection measure corresponding to the malfunction of the communication module 140 is return the flight of the unmanned aerial vehicle 100, that is, the current flight behavior of the unmanned aerial vehicle 100 is changed to fly to the return position. The return position is, for example, preset in a memory (not shown) of the unmanned aerial vehicle 100, which may be the same as or different from the take-off position, and the present disclosure is not limited thereto.

When the failure state of the unmanned aerial vehicle 100 detected by the failure processing circuit 130 is malfunction of the positioning module 150 or the actuator 110, the unmanned aerial vehicle 100 loses its direction on this occasion and no longer has navigating capability and cannot fly to the return position. Therefore, the protection measure corresponding to the malfunction of the positioning module 150 or the actuator 110 is in-situ landing, and the priority level corresponding the in-situ landing is higher than the priority level of the returning flight.

When the failure state of the unmanned aerial vehicle 100 detected by the failure processing circuit 130 is abnormality of the current attitude, the actuator 110 is unable to balance the unmanned aerial vehicle 100 or is severely failed. On this occasion, the unmanned aerial vehicle 100 may be in rotation or rolling. In such state, if power is continuously supplied to the unmanned aerial vehicle 100, a great damage is likely to be caused to surrounding environment. Therefore, the protection measure corresponding to the current abnormal attitude of the unmanned aerial vehicle 100 is to turn off the actuator 110, and the priority level of turning off the actuator 110 is higher than the priority level corresponding to the in-situ landing.

It should be noted that the above-described corresponding relationships and priority levels are merely illustrative and are not intended to limit the disclosure. In addition, the present disclosure provides no limitation to the definitions of the above-mentioned corresponding relationships and the priority levels, and the definitions may be pre-written in the failure processing circuit, or may be defined by the user.

When the flight behavior of the unmanned aerial vehicle 100 takes place, the failure processing circuit 130 detects the failure state of the unmanned aerial vehicle 100 (step S203), and the detected failure state is also referred to as the current failure state.

For example, the failure processing circuit 130 can determine whether the communication module 140 is malfunctioned according to the signal state between the communication module 140 and the external device; the failure processing circuit 130 can determine whether the actuator 110 is malfunctioned according to the signal from the actuator 110, such as abnormality of rotation speed and so on; the failure processing circuit 130 can determine whether the positioning module 150 is malfunctioned according to the signal from the positioning module 150; and the failure processing circuit 130 can determine whether the current attitude of the unmanned aerial vehicle 100 is abnormal according to the sensing data from the attitude sensor 160. For example, when the roll angle of the unmanned aerial vehicle 100 is greater than a preset roll angle threshold or the pitch angle is greater than a preset pitch angle threshold, the failure processing circuit 130 determines that the current attitude of the unmanned flight vehicle 100 is abnormal. However, the present disclosure provides no limitation to the specific determining method of the failure state, which can be set by persons skilled in the art as needed.

If there is one current failure state, the failure processing circuit 130 selects the protection measure corresponding to the current failure state as the selected protection measure according to the corresponding relationship (step S205), and then notifies the flight controller 120 of the selected protection measure.

For example, if the malfunction of the communication module 140 detected by the failure processing circuit 130 is the only one current failure state, the corresponding "return flight" is selected from the corresponding relationship between the failure state and the protection measure as the selected protection measure.

If there are multiple current failure states, the failure processing circuit 310 selects the selected protection measure with the highest priority level among the plurality of protection measures corresponding to the plurality of current failure states according to the previously defined corresponding relationship (step S207), and then notifies the flight controller 120 of the selected protection measure.

For example, if the failure processing circuit 130 detects two current failure states, namely malfunction of the communication module 140 and malfunction of the positioning module 150, since the protection measure "in-situ landing" corresponding to the malfunction of the positioning module 150 has a higher priority level than the protection measure "return flight" corresponding to malfunction of the communication module 140, such that the failure processing circuit 130 selects "in-situ landing" as the selected protection measure.

Finally, the flight controller 120 controls the flight behavior of the unmanned aerial vehicle 100 according to the selected protection measures (step S209).

For example, if the flight controller 120 receives the selected protection measure "return flight" from the failure processing circuit 130 during the flight of the unmanned aerial vehicle 100 toward the destination, the flight controller 120 will change the flight behavior of the unmanned aerial vehicle 100 according to the selected protection measure "return flight", that is, the unmanned aerial vehicle 100 is controlled to fly to the return position according to the location information from the positioning module 150. On this occasion, if another current failure state occurs, causing the flight controller 120 to receive the selected protection measure "in-situ landing" from the failure processing circuit 130, the flight controller 120 will stop changing the flight behavior of the unmanned aerial vehicle 100 according to the protection measure "return flight" with lower priority level, and change the flight behavior of the unmanned aerial vehicle 100 according to the protection measure "in-situ landing" with higher priority level, such that the unmanned aerial vehicle 100 is landed in situ.

In this way, no matter whether multiple current failure states occur simultaneously or alternately, the failure processing circuit 130 can take the most appropriate protection measures according to the priority level to minimize damage and loss. Another embodiment will be described below to illustrate the fail-safe method from the perspective of the processing logic of the failure processing circuit 130.

Figure 3:
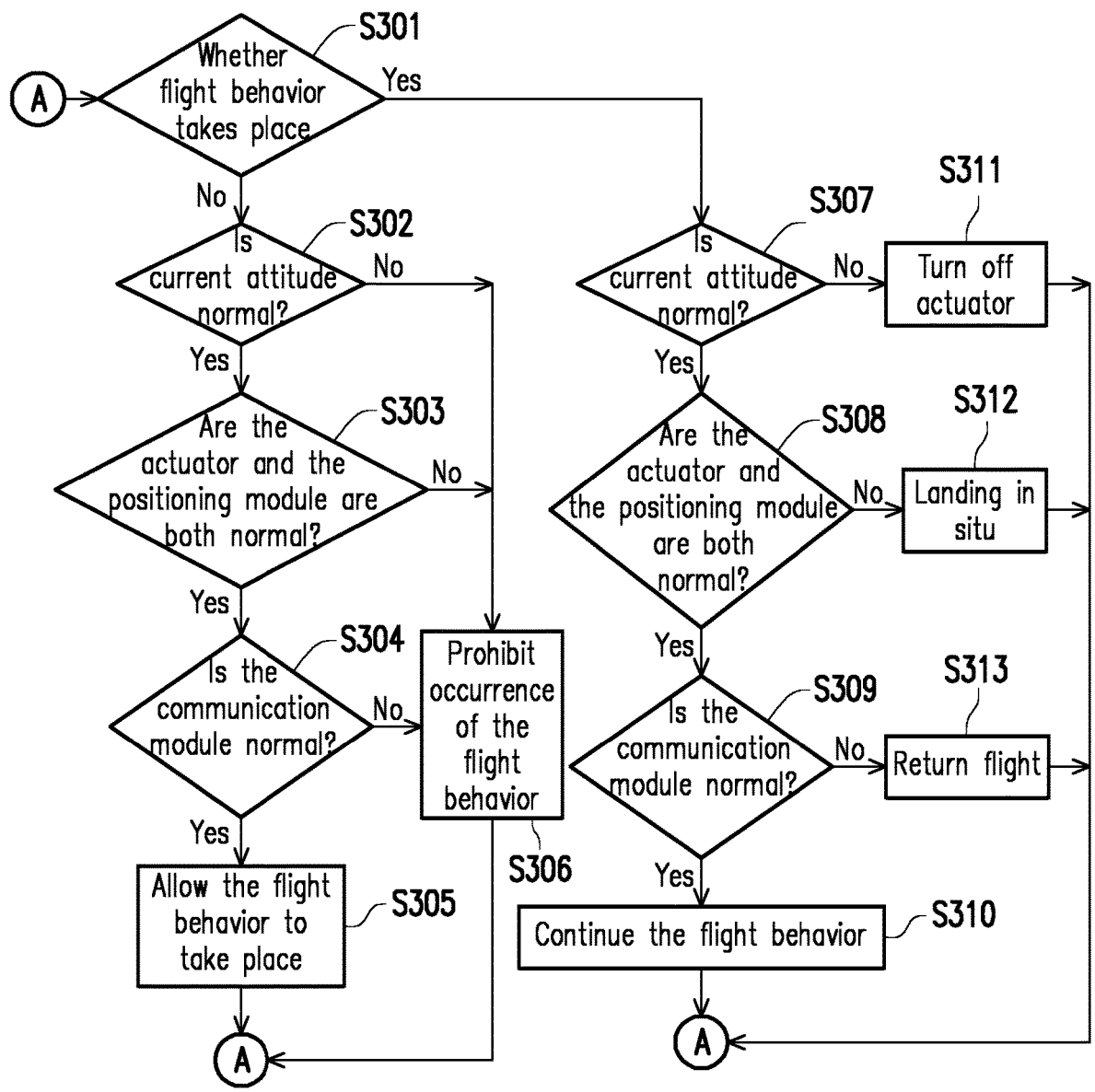
FIG. 3 is a flow chart of a fail-safe method according to an embodiment of the present disclosure.

FIG. 3 is a flow chart of a fail-safe method according to an embodiment of the present disclosure.

Referring to FIG. 1 and FIG. 3, first, the failure processing circuit 130 determines whether the flight behavior of the unmanned aerial vehicle 100 has taken place (step S301).

For example, the failure processing circuit 130 can determine whether the actuator 110 (e.g., power source) of the unmanned aerial vehicle 100 has begun to operate. If the actuator 110 does not start to operate, it is determined that the flight behavior of the unmanned aerial vehicle 100 has not taken place; otherwise, it is determined that the flight behavior of the unmanned aerial vehicle 100 has taken place.

If the failure processing circuit 130 determines that the flight behavior of the unmanned aerial vehicle 100 has not taken place, it is detected whether there is a current failure state, and the flight behavior will be prohibited if any current failure state is detected.

For example, the failure processing circuit 130 determines whether the current attitude of the unmanned aerial vehicle 100 is normal (step S302), determines whether the actuator 110 and the positioning module 150 are both normal (step S303), and determines whether the communication module 140 is normal (step S304). If the failure processing circuit 130 determines that the current attitude of the unmanned aerial vehicle 100, the actuator 110, the positioning module 150, and the communication module 140 are all normal, the flight behavior is allowed (step S305), that is, the notification of prohibiting the flight behavior is not issued to the flight controller 120. On the other hand, if the failure processing circuit 130 determines that one of the current attitude of the unmanned aerial vehicle 100, the actuator 110, the positioning module 150, and the communication module 140 is abnormal, the flight behavior is prohibited (step S306), for example, the notification of prohibiting the flight behavior is sent to the flight controller 120 to prevent the flight controller 120 from instructing the actuator 110 to operate. No matter whether the unmanned aerial vehicle 100 executes troubleshooting, the failure processing circuit 130 returns to step S301 to continuously determine whether the flight behavior of the unmanned aerial vehicle 100 has taken place.

If the failure processing circuit 130 determines that the flight behavior of the unmanned aerial vehicle 100 has taken place, the protection measure with the highest priority level corresponding to the current failure state is taken when a current failure state is detected.

For example, the failure processing circuit 130 sequentially detects whether the failure state occurs according to the priority level of the corresponding protection measures, and directly takes a corresponding protection measure when detecting the failure state (i.e., the current failure state).

Referring to FIG. 3 and Table 1 at the same time, since the protection measure corresponding to the current attitude anomaly has the highest priority, the failure processing circuit 130 first determines whether the current attitude of the unmanned aerial vehicle 100 is normal (step S307), and when it is determined that the current failure state is abnormality of the current attitude according to the corresponding relationship between the failure state and the protection measure, notify the flight controller 120 to turn off the actuator 110 (step S311).

Since protection measures corresponding to malfunction of the actuator 110 and malfunction of the positioning module 150 have high priority level, after the failure processing circuit 130 determines that the current attitude of the unmanned aerial vehicle 100 is normal, it is then determined whether the actuator 110 and the positioning module 150 are both normal (step S308). Moreover, when it is determined that the current failure state is that at least one of the actuator 110 and the positioning module 150 is malfunctioned according to the corresponding relationship between the failure state and the protection measure, the flight controller 120 is notified to control the unmanned aerial vehicle 100 to land in situ (step S312).

Since the priority level of the protection measure corresponding to the malfunction of the communication module 140 is the lowest, after the failure processing circuit 130 determines that current attitude of the unmanned aerial vehicle 100, the actuator 110, and the positioning module 150 are all normal. And then the failure processing circuit 130 determines whether the communication module 140 is normal (step S309). Moreover, when it is determined that the current failure state is malfunction of the communication module 140 according to the corresponding relationship between the failure state and the protection measure, the flight controller 120 is notified to control the unmanned aerial vehicle 100 to return, that is, to fly to the return position (step S313). After the unmanned aerial vehicle 100 turns off the actuator 110 (step S311), is landed in situ (step S312) or flies to the return position (step S313), no matter whether the unmanned aerial vehicle 100 executes troubleshooting, the failure processing circuit 130 returns to step S301 to continuously determine whether the flight behavior of the unmanned aerial vehicle 100 has taken place.

If the failure processing circuit 130 does not detect any current failure state when the flight behavior takes place, the flight controller 120 is not notified, and the flight controller 120 controls the actuator 110 to continue the flight behavior of the unmanned aerial vehicle 100 (step S310).

Specifically, the failure processing circuit 130 may, for example, perform the flow of the embodiment of FIG. 3 at a particular frequency (for example, but not limited to, 3 times per second). As such, similar to the embodiment of FIG. 2, no matter whether multiple current failure states occur simultaneously or alternately, the failure processing circuit 130 is able to take the most appropriate current protection measures based on priority level to minimize damage and loss.

In summary, the unmanned aerial vehicle and the fail-safe method thereof in the embodiment of the present disclosure define a corresponding relationship between a plurality of failure states and a plurality of protection measures, and set one priority for each of the protection measures. When multiple failure states occur at the same time, the protection measure with the highest priority level is selected among the multiple protection measures corresponding to the multiple failure states occurring at the moment. Accordingly, no matter whether multiple failure states occur simultaneously or alternately, the most appropriate protection measures can be taken according to the defined priority levels to minimize damage and loss.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An unmanned aerial vehicle, comprising: at least one actuator, a failure processing circuit, and a flight controller; wherein,
    the at least one actuator is configured to drive a flight behavior of the unmanned aerial vehicle;
    the failure processing circuit is configured to:
        define a corresponding relationship between a plurality of failure states and a plurality of protection measures, wherein each of the plurality of protection measures is respectively defined with a priority level and each of the plurality of protection measures is used to correspondingly change the flight behavior of the unmanned aerial vehicle;
        determine a plurality of current failure states when the flight behavior takes place, wherein the plurality of failure states comprise the plurality of current failure states; and
        select, according to the corresponding relationship, a selected protection measure having the highest priority level among the plurality of protection measures corresponding to the plurality of current failure states; and
    the flight controller is coupled to the actuator and the failure processing circuit, and configured to change the flight behavior of the unmanned aerial vehicle according to the selected protection measure.

2. The unmanned aerial vehicle according to claim 1, wherein the flight controller is further configured to stop changing the flight behavior according to the plurality of protection measures with lower priority levels other than the selected protection measure.

3. The unmanned aerial vehicle according to claim 1, wherein before the flight behavior takes place, the failure processing circuit is configured to:
    determine whether the unmanned aerial vehicle has a current failure state; and
    prohibit occurrence of the flight behavior when it is determined that the unmanned aerial vehicle has the current failure state.

4. The unmanned aerial vehicle according to claim 1, further comprising:
    a communication module, coupled to the failure processing circuit for receiving a remote control signal from an external device, wherein determining the plurality of current failure states by the failure processing circuit comprises determining whether the communication module is malfunctioned.

5. The unmanned aerial vehicle according to claim 4, further comprising:
    a positioning module, coupled to the failure processing circuit, wherein determining the plurality of current failure states by the failure processing circuit comprises determining whether the positioning module or the actuator is malfunctioned,
    wherein the priority level of the protection measure corresponding to the malfunction of the positioning module or the actuator is higher than the priority level of the protection measure corresponding to the malfunction of the communication module.

6. The unmanned aerial vehicle according to claim 5, further comprising:
    an attitude sensor, coupled to the failure processing circuit for sensing a current attitude of the unmanned aerial vehicle, wherein determining the plurality of current failure states by the failure processing circuit comprises determining whether the current attitude is abnormal,
    wherein the priority level of the protection measure corresponding to abnormality of the current attitude is higher than the priority of the protection measure corresponding to the malfunction of the positioning module or the actuator failure.

7. The unmanned aerial vehicle according to claim 6, wherein the protection measure corresponding to abnormality of the current attitude is to turn off the actuator.

8. The unmanned aerial vehicle according to claim 4, wherein the protection measure corresponding to the malfunction of the communication module is return flight.

9. The unmanned aerial vehicle according to claim 8, further comprising:
    a positioning module, coupled to the flight controller, configured to obtain location information of the unmanned aerial vehicle, wherein the flight controller controls the actuator to change the flight behavior of the unmanned aerial vehicle according to the location information when the selected protection measure is return flight, such that the unmanned aerial vehicle controlled to fly to a return position.

10. The unmanned aerial vehicle according to claim 5, wherein the protection measure corresponding to the malfunction of the positioning module or the actuator is landing in situ.

11. A fail-safe method for an unmanned aerial vehicle, wherein the fail-safe method comprises:
    defining a corresponding relationship between a plurality of failure states and a plurality of protection measures, wherein each of the plurality of protection measures is respectively defined with a priority level and the plurality of protection measures are used to correspondingly change a flight behavior of the unmanned aerial vehicle;

determining a plurality of current failure states when the flight behavior of the unmanned aerial vehicle takes place, wherein the plurality of failure states comprise the plurality of current failure states;

selecting, according to the corresponding relationship, a selected protection measure having the highest priority level among the plurality of protection measures corresponding to the plurality of current failure states; and changing the flight behavior of the unmanned aerial vehicle according to the selected protection measure.

12. The fail-safe method according to claim 11, further comprising:

stopping changing the flight behavior according to the plurality of protection measures with lower priority level other than the selected protection measure.

13. The fail-safe method according to claim 11, wherein before the flight behavior takes place, the fail-safe method further comprises:

determining whether the unmanned aerial vehicle has a current failure state; and prohibiting occurrence of the flight behavior when it is determined that the unmanned aerial vehicle has the current failure state.

14. The fail-safe method according to claim 11, wherein the step of determining the plurality of current failure states comprises:

determining whether a communication module of the unmanned aerial vehicle has a malfunction, wherein the communication module is configured to receive a remote control signal from an external device.

15. The fail-safe method according to claim 14, wherein the step of determining the plurality of current failure states comprises:

determining whether a positioning module or an actuator of the unmanned aerial vehicle has a malfunction, wherein the positioning module is configured to obtain location information of the unmanned aerial vehicle, and the actuator is configured to drive the flight behavior, wherein the priority level of the protection measure corresponding to the malfunction of the positioning module or the actuator is higher than the priority level of the protection measure corresponding to the malfunction of the communication module.

16. The fail-safe method according to claim 15, wherein the step of determining the plurality of current failure states comprises:

sensing a current attitude of the unmanned aerial vehicle; and determining whether the current attitude is abnormal, wherein the priority level of the protection measure corresponding to abnormality of the current attitude is higher than the priority level of the protection measure corresponding to the malfunction of the positioning module or the actuator.

17. The fail-safe method according to claim 16, wherein the protection measure corresponding to abnormality of the current attitude is to turn off the actuator.

18. The fail-safe method according to claim 14, wherein the protection measure corresponding to the malfunction of the communication module is return flight.

19. The fail-safe method according to claim 18, further comprising:

obtaining location information of the unmanned aerial vehicle through a positioning module; and when the selected protection measure is returning flight, changing the flight behavior of the unmanned aerial vehicle according to the location information, such that the unmanned aerial vehicle is controlled to fly to a return position.

20. The fail-safe method according to claim 15, wherein the protection measure corresponding to the malfunction of the positioning module or the actuator is landing in situ.

\* \* \* \* \*